W. LEWIS.
MOLDING MACHINE.
APPLICATION FILED JAN. 9, 1914.
1,157,403.
Patented Oct. 19, 1915.
5 SHEETS—SHEET 1.
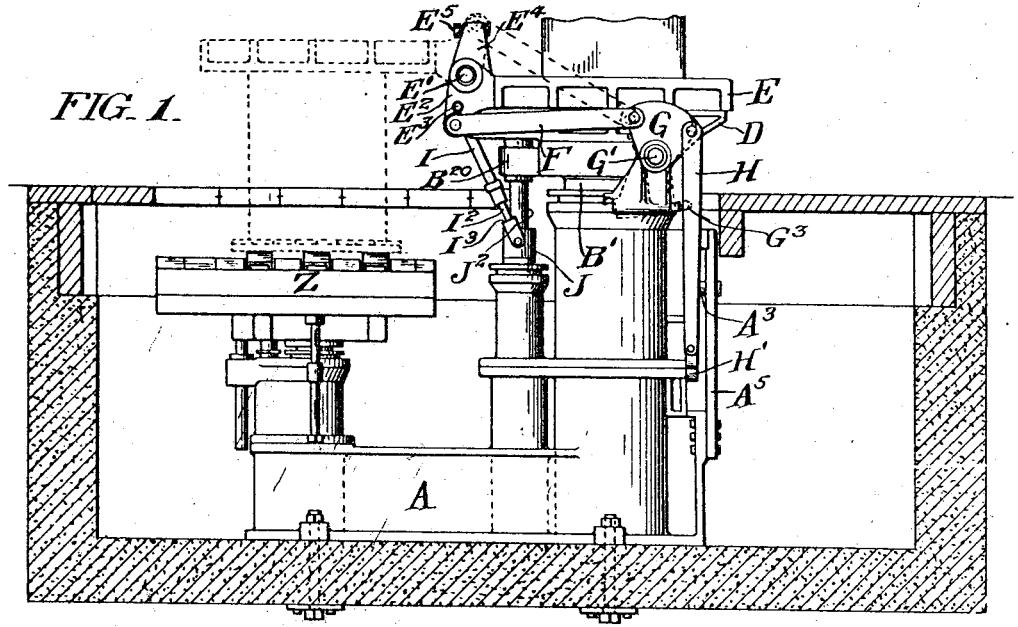
FIG. 1.
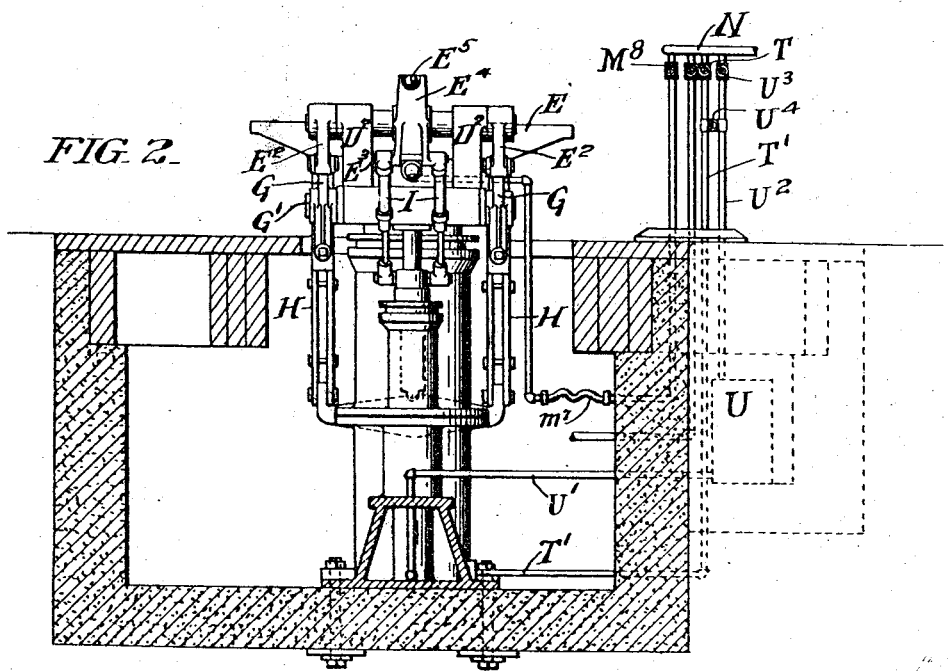
FIG. 2.
WITNESSES
INVENTOR
BY
ATTORNEY

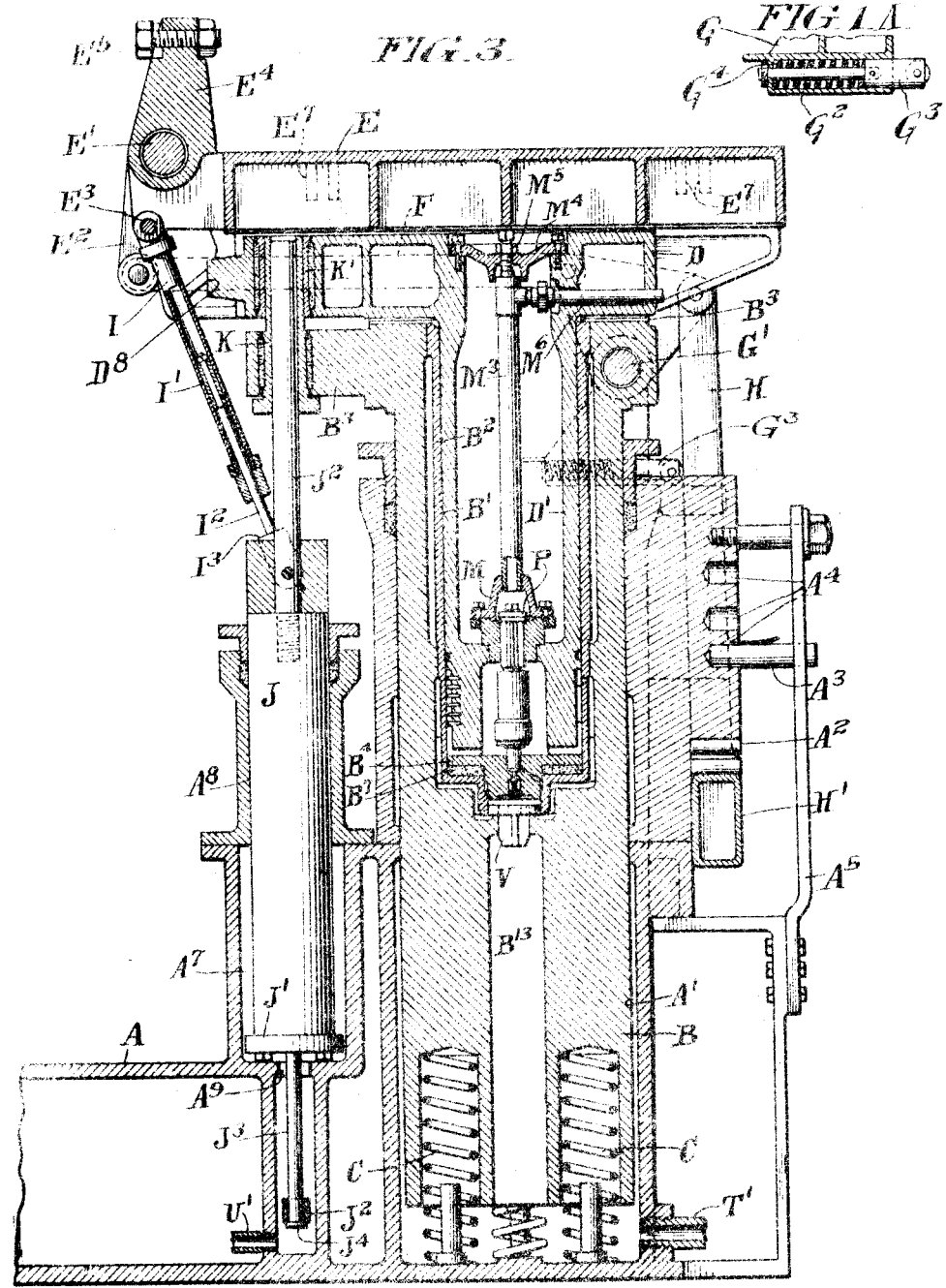

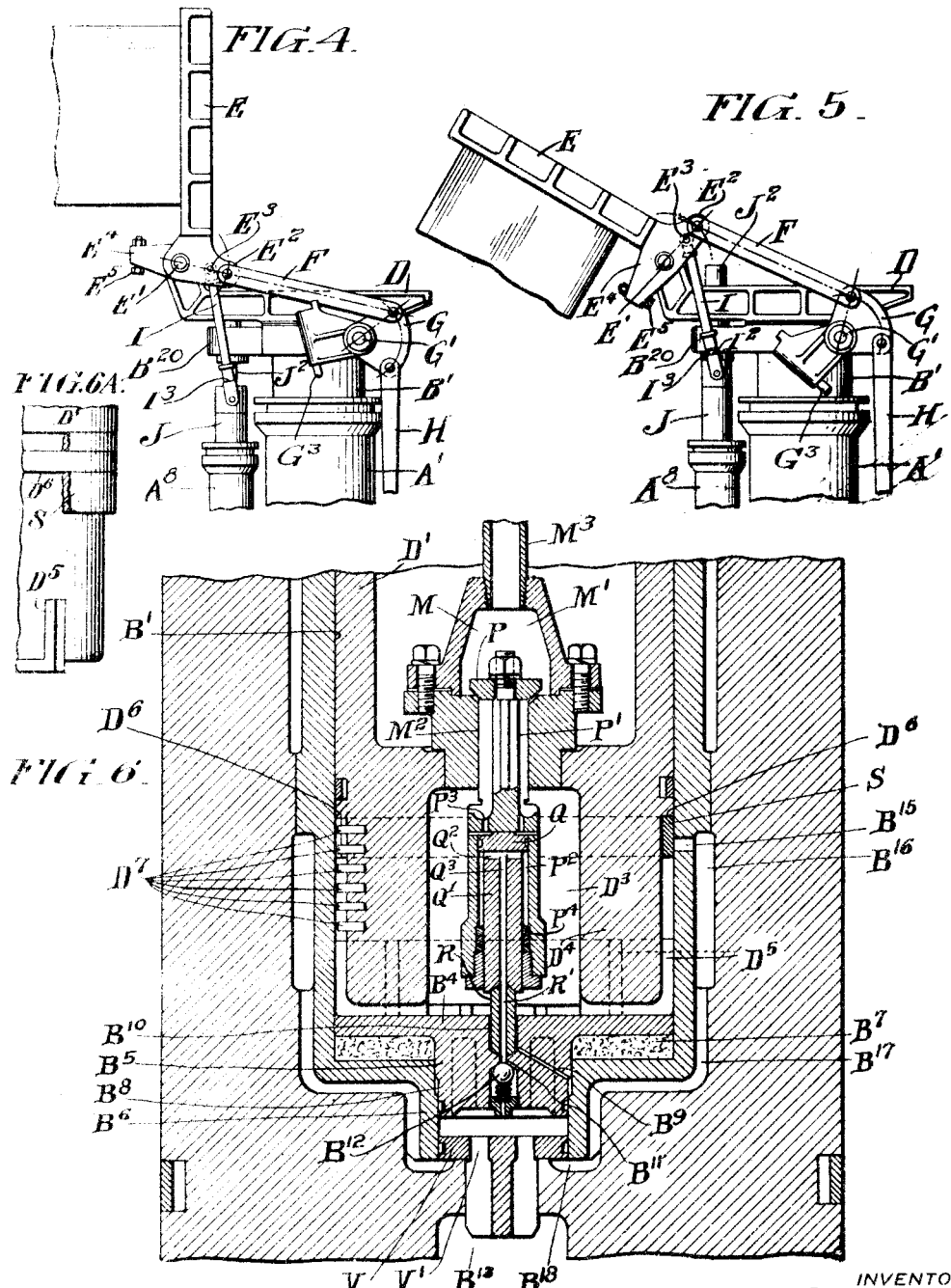

W. LEWIS.
MOLDING MACHINE.
APPLICATION FILED
1,157,403.
Patented Oct. 19, 1915.
5 SHEETS—SHEET 4.
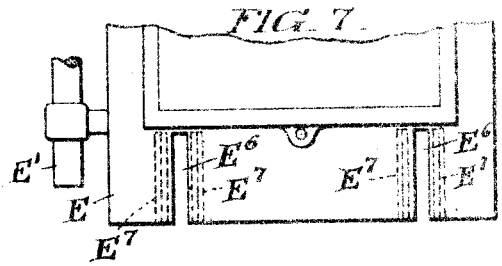
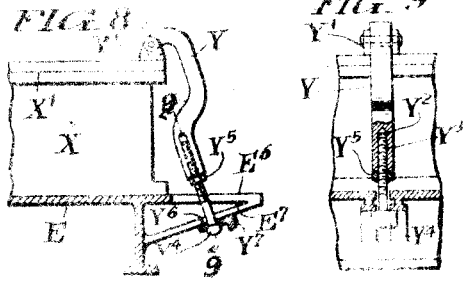
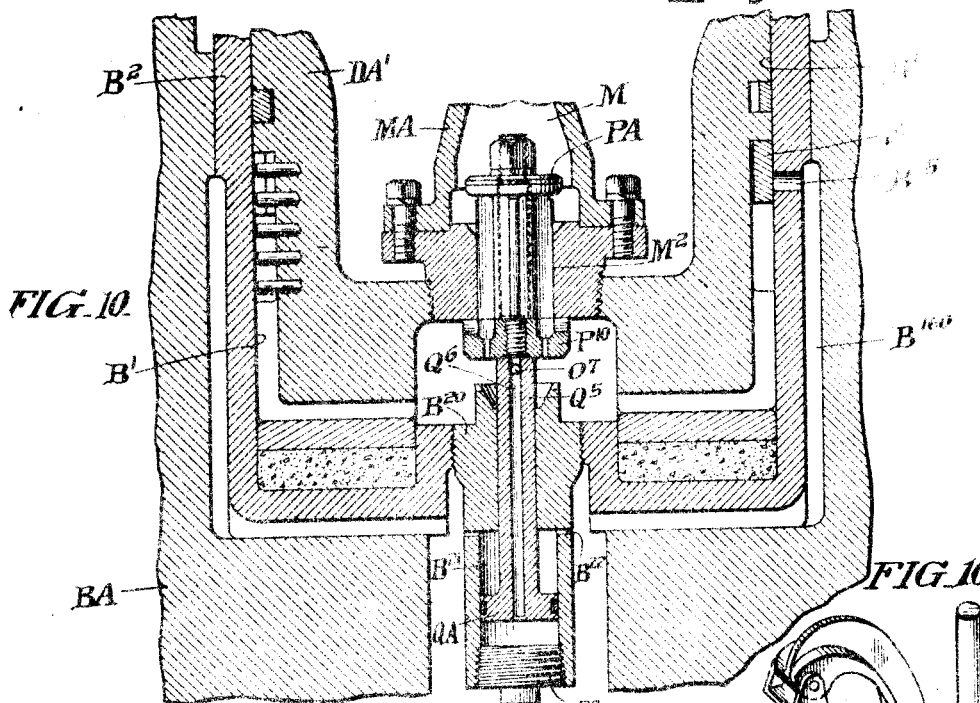
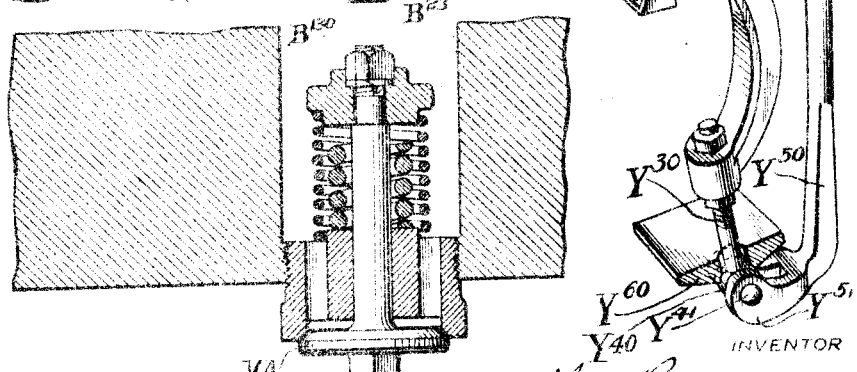
WITNESSES
INVENTOR
Wilfred Lewis
BY
Francis T. Chambers
ATTORNEY

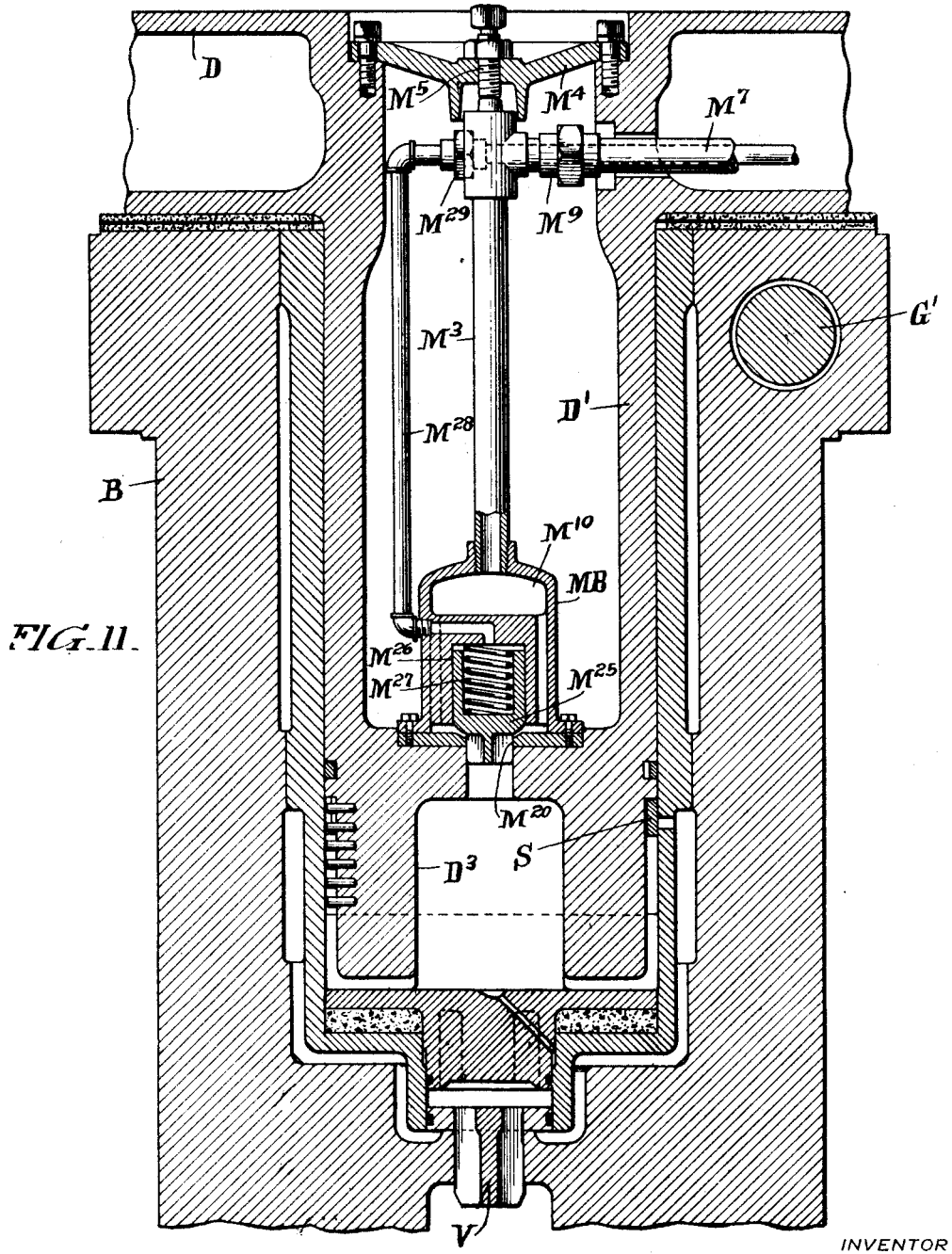

UNITED STATES PATENT OFFICE.

WILFRED LEWIS, OF PHILADELPHIA, PENNSYLVANIA.

MOLDING-MACHINE.

1,157,403.  Specification of Letters Patent.  Patented Oct. 19, 1915.

Application filed January 9, 1914. Serial No. 811,131.

*To all whom it may concern:*

Be it known that I, WILFRED LEWIS, a citizen of the United States of America, residing in the city and county of Philadelphia, in the State of Pennsylvania, have invented certain new and useful Improvements in Molding-Machines, of which the following is a true and exact description, reference being had to the accompanying drawings, which form a part thereof.

My present invention relates to molding machines, and particularly to molding machines of the type in which the mold forming material is compacted about the patterns by lifting a mold support or table, on which the flask, pattern and mold forming material are supported, and then allowing the support or table to fall back into collision with an anvil, and in which provisions are made for rolling the mold over and depositing it on a suitable receiving device after the mold forming material has been compacted, and for thereafter imparting an upward movement to the patterns to draw the latter from the molds.

The general objects of my invention are to provide improvements in the mechanism employed for rolling the mold over, and in the valve mechanism by which the operation of the roll-over mechanism and the jar ramming operation are controlled.

An important feature of my invention is the manner in which I use the floating anvil of a so called shockless jar molding machine, of the type described and claimed in my prior Patent 941,999, granted November 30th, 1909, for operating, and indeed as a part of the roll-over mechanism.

The various features of novelty which characterize my invention are pointed out with particularity in the claims annexed to and forming a part of this specification. For a better understanding of the invention, however, and its specific objects, reference should be had to the accompanying drawings and descriptive matter in which I have illustrated and described forms in which my invention may be embodied.

Of the drawings: Figure 1 is an elevation of a molding machine embodying a preferred form of my invention, the molding machine being mounted in a pit which is shown in section; Fig. 1ᴬ is a sectional elevation of a portion of the apparatus shown in Fig. 1; Fig. 2 is a view taken at right angles to Fig. 1, with parts of the molding machine removed; Fig. 3 is a sectional elevation of a portion of the molding machine shown in Figs. 1 and 2; Fig. 4 is a somewhat diagrammatic elevation of a portion of the molding machine with parts in the position occupied when the roll-over operation is about half completed; Fig. 5 is a view taken similarly to Fig. 4, showing the parts in a later stage of the roll-over operation; Fig. 6 is a view taken similarly to Fig. 3, but on a larger scale, and showing a portion only of the apparatus shown in Fig. 3; Fig. 6ᴬ is an elevation of a portion of the piston of the mold supporting element shown in Fig. 6; Fig. 7 is a partial plan of the roll-over table; Fig. 8 is a sectional elevation of a portion of the roll-over table showing the manner in which a flask is clamped to the table; Fig. 9 is an elevation partly in section on the line 9—9 of Fig. 8; Fig. 10 is a view taken similarly to Fig. 3, showing a modified construction; Fig. 10ᴬ is a perspective view of a modified form of clamp; and Fig. 11 is a view taken similarly to Fig. 3, showing a further modification.

In the drawings, A represents the stationary supporting base of the machine. As shown, the base A is formed with a cylinder space A′, in which the vertically movable floating anvil B is mounted. The anvil B rests upon a resilient supporting cushion, which, as shown, is formed by helical springs C. The anvil B is formed with a central cavity or cylinder space B′ in its upper portion, which is lined by the sleeve B², and receives the piston extension D′ of the mold supporting element D of the molding machine. In collision the mold support D engages the anvil B both at the top and at the bottom of the cylinder space B′.

B³ represents a washer or buffer plate, advantageously formed of leather and sheet iron or of hard wood fiber, interposed between the striking surfaces of the mold support and anvil at the upper end of the latter. The lower end of the anvil D′ impinges against a metal disk B⁴ fitting in the cylinder space B′ and provided with a central boss B⁵ fitting in a tubular portion B⁶ of the lower end wall of the space B′.

B⁷ represents a washer of cork or the like placed beneath the disk B⁴. For convenience in assembly the boss B⁵ and the tubular part B⁶ each comprise portions of different diameters and the annular chamber B⁸ thus formed is connected by the passage B⁹ and socket B¹⁰ in the member B⁴ to the interior of cylinder space B'. It will be understood, of course, that the axial length of the chamber B⁸ will increase and decrease as the thickness of the washer B⁷ varies in operation.

The mold in the combined machine shown does not rest directly upon the support D, but on the roll-over table E, which is pivotally connected to the support D by means of the shaft E' secured to the table E at one edge of the latter and journaled in the lugs or bracket ears D² carried by the support D. In the operation of the machine, as hereinafter explained, the table E is turned or rolled over from the position shown in full lines in Fig. 1 into the dotted line position of that figure, in order to deposit a mold which has been formed on the table E on the mold receiving device Z. The mold containing flask X must be securely anchored to the table E during the roll-over operation and for this purpose I may advantageously employ the clamping means shown in Figs. 7 to 9. These means comprise clamps Y each consisting of a body having a jaw member Y' pivotally connected to its upper end, and having a threaded socket Y² formed in its lower end. A threaded rod Y³ is screwed into each socket Y² and may be locked in any desired adjustment by the lock nut Y⁵. The lower end of the rod Y³ terminates in a spherical head Y⁴ which seats against the under side of a slide block Y⁶ through an aperture in which the rod Y³ passes. In use the jaw Y' of each clamp engages the bottom of the flask Y, or, more usually, the bottom mold board X', while the clamp portion Y³ passes through a corresponding slot E⁶ in the table E, and the slide block Y⁶ engages the under edges of the inclined guides or ribs E⁷. The rod Y³ is adjusted in the socket Y² to make the clamp of such length that the flask X will be firmly clamped against the table E when the clamp is in place with the slide block Y⁶ moved along the guide ribs E⁷, as shown in Fig. 8, to set the line of action of the clamps at an angle to the perpendicular to the bottom edges of the ribs E⁷. The slide block E⁶ may be readily moved along the ribs E⁷ to tighten or release the clamp by striking the projection Y⁷ of the block Y⁶ with a suitable tool or implement.

In the modified clamp construction shown in Fig. 10ᴬ, the head of the bolt part Y³⁰ has a lever Y⁵⁰ pivotally connected to it. As shown the lever Y⁵⁰ is bifurcated, the bifurcations Y⁵¹ straddling the bolt head Y⁴⁰ and being each journaled on the corresponding end of a transverse shaft Y⁵² passing through the bolt head. The bifurcations terminate in substantially cylindrical bosses eccentric with respect to the axis of the shaft Y⁵². The bosses thus form eccentrics or cams engaging the block Y⁶⁰ corresponding generally to the block Y⁶ of the construction shown in Figs. 7 to 9. The clamp of Fig. 10ᴬ may be used with the same slotted table previously described and may be adjusted along the ribs E⁷ as in the construction first described. In addition the lever Y⁵⁰ forms an additional clamp tightening and releasing device substantially increasing the adjustability of the clamp. With either of the clamping arrangements shown the clamp adjusting means are readily accessible when the mold is inverted as well as when the mold is still on top of the rock-over table.

I utilize the floating anvil B to bring about the roll-over movement of the table E, and the operating connections which I employ for this purpose comprise links F, each pivotally connected at one end to a corresponding arm E² of the table E, and pivotally connected at its other end to a rocker G. The two rockers G at the opposite sides of the machine are mounted on a shaft G' which is carried by the anvil B. The two rockers G are each pivotally connected to the upper end of a corresponding link H. The links H are pivotally connected at their lower ends to the lugs on the ends of a cross head yoke H'. During the jarring operation the yoke H' lies beneath but does not engage a shoulder or stop A² of the base A. In the roll-over operation, however, the anvil B is moved upward far enough to cause the yoke H' to engage the stop A² and thereby swing the rockers G about the axis of the shaft G'. In the pattern drawing operation, as hereinafter explained, the plungers G³ carried by the rockers G swing the link H out so that the yoke H' clears the stop A².

While the mechanism already referred to is sufficient, on the proper up and down movements of the anvil B, to rock the mold table E from the full line position shown in Fig. 1 into the dotted line position of that figure, and to draw the patterns, and to return the table E to the full line position after the patterns are drawn, I prefer to employ the auxiliary means which I will now describe to aid in bringing about and controlling the rocking movements of the table E, to assist in the pattern drawing operation, and to perform the other functions hereinafter referred to. These auxiliary means comprise links I each pivotally connected at one end to the table E through a pin E³ secured to the latter and pivotally connected at its other end to the plunger J. The latter works in a cylinder space comprising an enlarged lower portion A⁷, and an upper portion A⁸ of smaller diameter, and the plunger J is formed with a collar J' at its lower end working in the enlarged lower cylinder A⁷ and limiting the upward movement of the plunger. As shown, the links I are each formed of telescoping sections I' and I², whereby each link may elongate from a minimum length in which the end of the section I' engages the shoulder I³ of the section I². It will be understood, of course, that each link I is effective as a thrust transmitting strut only when the link is of minimum length. The plunger J is also formed with an axial extension J², of reduced diameter, which passes through the sleeve K mounted in an aperture formed for the purpose in the lug B³ of the anvil, and also telescoping with a sleeve K' mounted in an alined aperture in the mold support D. The extension J² and sleeves K and K' coöperate to hold the anvil B and piston D' against rotation about their common axis relative to the base.

The admission of the motive fluid to the lower end of the chamber B' beneath the piston D'-to lift the mold support D and its load relative to the anvil B comprises a valve mechanism axially disposed in the piston D' which is hollow. As shown this valve mechanism comprises a casing M secured in the piston D' and formed with an inlet chamber M' and a valve seated port M² leading therefrom to the under side of the piston D' or more directly, as shown, to the upper end of a chamber D³ formed in the lower end of the piston D'.

The motive fluid, ordinarily compressed air, is passed to the valve chamber M' from the supply pipe N through the valve M⁸, pipes M⁷ and M³. The pipe M⁷ includes a flexible section m⁷. The valve M⁸ which is manually operated is mounted on a stand located at one side of the machine, and is adapted to connect the pipe M⁷ either to the supply pipe N or to the atmosphere. The pipe section M³, which is axially disposed within the hollow piston D', is threaded at its lower end into the valve casing M, and at its upper end is mechanically connected by the bolt M⁵ to the spider M⁴ which is detachably connected to the member D and closes the upper end of the cavity formed in the upper portion of the piston D'. The flow of the pressure fluid out of the chamber M' through the port M² is directly controlled by a valve member P. The fluted stem P' of the latter is enlarged at its lower end to provide a cylinder space P² receiving a piston Q. The stem Q' of the piston Q bears at its lower end against the abutment member or strut R, interposed between it and the bottom of the chamber B¹⁰ formed in the member B⁴ to receive the strut R. Passages P³ place the portion of the piston chamber P² above the piston Q in free communication at all times with the chamber D³. The interior of the chamber P² beneath the piston Q is connected by the passages Q² and Q³ formed in the stem Q', and the passage R' formed in the strut R in alinement with the passage Q³, and the passage B¹¹ formed in the member B⁴ and controlled by check valve B¹² and the passages V' formed in the check valve V, with the passage B¹³ leading to the space in the cylinder chamber A' beneath the floating anvil B. The last mentioned space is open to the atmosphere during the jar ramming operation.

The exhaust from the lower end of the chamber B' is through outlet ports B¹⁵ formed in the lining B² and is controlled by an annular valve member S in the form of a split ring mounted within the sleeve B² and pressed outward against the latter by its own resiliency and the pressure in the lower end of the chamber B'. As shown, the ports B¹⁵ are located some distance above the bottom of the chamber B' and the valve S surrounds a lower portion D⁴ of the piston D' which is of reduced diameter. The valve S is moved up to open the ports B¹⁵ as the member D approaches the upper limit of its movement relative to the anvil, and down to close these ports as the lower limit of said movement is approached by the ribs D⁵ formed on the periphery and lower end of the piston portion D⁴ (see Fig. 6A) and by the shoulder D⁶ at the upper end of said portion D⁴. A vertical row of studs D⁷ projecting radially from the piston portion D⁴ unite to form a guide rib engaging the ends of the valve ring S and preventing the latter from rotating about the axis of the piston D. The outlet ports B¹⁵ open into a chamber B¹⁶ formed in the anvil B surrounding the sleeve B². This chamber is connected by passageways B¹⁷ to a chamber B¹⁸. Communication between the last mentioned chamber and the passage B¹³ is controlled by the check valve V.

Pressure fluid is supplied to the lower end of the cylinder space A' to lift the anvil B in rolling the table E over through the pipe T' and valve T. The valve T is mounted on the operating stand at one side of the machine and normally connects the pipe T' to the atmosphere but may be adjusted to connect the pipe to the compressed air supply pipe N. The pressure fluid admitted to the lower end of the chamber A⁷ is water, oil, or other liquid supplied from a reservoir U through a pipe U'. Compressed air is supplied to the top of the reservoir U through the pipe U² and valve U³ from the supply pipe N. The flow of liquid into and out of the chamber A⁷ through the port A⁹ is retarded in one position of the plunger J by the plunger carried part J² for a reason hereinafter explained.

In operation, to compact the mold forming material in the flask surrounding the pattern or patterns mounted on the table E, the valve M⁸ is opened thus admitting compressed air or other pressure fluid to the inlet chamber M' of the inlet valve mechanism M. In the lowermost position of the mold support D relative to the anvil, as shown best in Fig. 6, the valve P is held off its seat so that the pressure fluid may then pass through the port M² into the lower end of the cylinder space B'. As the pressure in the last mentioned space builds up the valve P is moved to the wide open position and held there throughout the major portion of the upward movement of the piston D', as the pressure within the chamber P² beneath the piston Q proper is then less than the pressure in the chambers M' and D³. The rise in pressure in the chamber, B' raises the piston D', and the continued upward movement of the piston D' causes the piston Q to engage the packing ring P⁴ and thereby seat the valve P, thus interrupting the admission of the pressure fluid to the chamber D³. At or about this time the shoulders D⁵ of the piston D engage the ring valve S and move the latter upward to open the ports B¹⁵, whereupon the pressure fluid exhausts from the space below the piston D' through the ports B¹⁵, chambers B¹⁶ and B¹⁸ and passages B¹⁷, the check valve V lifting to permit the escape of the fluid into the passage B¹³. When the pressure fluid thus exhausts, the support D with the table and flask supported thereby fall back into collision with the anvil B, and the separation of the mold support and anvil, and the subsequent collision, are repeated as often as necessary to compact the mold forming material to the desired extent.

After the mold forming material has been suitably compacted, the valves are adjusted to admit pressure fluid to the lower end of the chamber A' beneath the anvil B. As pressure fluid is thus admitted to the lower end of the space A', the anvil moves upward. The upward movement of the anvil does not disturb the relative positions of the anvil and the parts carried by it, however, until the yoke member H' engages the shoulder A² of the framework of the machine, thus preventing further upward movement of the yoke, after which, as the anvil B continues to move upward, the rockers G are turned about the axis of the shaft G', and through the links F turn the table E about the axis of the shaft E'. The upward movement of the anvil B continues until the parts are moved into the position shown in Fig. 4, in which the axis of the pivotal connection between the links F and the arms E³ is in a plane with the axis of the shaft E' and the axis of the shaft G'. The anvil B must then be allowed to descend in order to complete the turning movement of the table E necessary to bring the latter into the position relative to the anvil shown in dotted lines in Fig. 1. Where the links F form the sole operating connections engaging the table E to turn the latter, the parts should be so proportioned that the center of gravity of the table E and its load will be carried over the axis of the shaft E by the time the parts have moved into the positions shown in Fig. 4, for otherwise the table E will not complete its rocking movement on the subsequent descent of the anvil. Where the hydraulic plunger J with its operating connections to the table E is employed, as shown, it is not necessary, however, that the center of gravity of the table E and its load be moved over the axis of the shaft E' by the time the parts move into the positions shown in Fig. 4, inasmuch as the plunger J through the connection I is adapted to impart the necessary turning movement to the table E when the parts are in the position shown in Fig. 4. The pressure in the tank U, which supplies liquid to the chamber A⁷, may be controlled in various ways. For instance, with the apparatus shown in which the pipe U² is connected to the pipe T' by the valved connection U⁴, the pressure in the tank U may be adjusted as is the pressure in the chamber A' by manipulating the valve T with the valved connection U⁴ open and the valve U³ closed; or, with the valved connection U⁴ closed the pressure in the tank U may be adjusted independently of the pressure in the chamber A' by manipulating the valve U³. The manner in which the pressure in the tank U is thus controlled may be varied to suit the convenience of the operator, or to meet different conditions as to air pressure and working loads. For instance, with heavy loads I may maintain full pressure in the reservoir U and chamber A⁷ by keeping the valve U³ open and the valved connection U⁴ closed in raising and lowering the anvil B. With medium or light loads, on the other hand, I may simultaneously adjust the pressures in the chambers A' and A⁷. The plunger J, which in some cases, at least, need not be large enough to lift the anvil, aids in bringing about the upward movement of the anvil and opposes the downward movement of the anvil except when the apparatus is in the condition shown in Fig. 3, and in that condition of the apparatus the effect of the plunger J is negligible. The fact that th plunger J is operated by a liquid instead of by compressed air, makes the plunger J somewhat sluggish in operation and steadies the movement of the anvil B.

As the anvil descends from the position shown in Fig. 4, and the table E continues to turn in a counter-clockwise direction, the upper end of the plunger J comes into contact with the flange B⁵ of the anvil B, whereupon the connections I begin to elongate and become ineffective. The opposition to the downward movement of the plunger J is of great importance in preventing too violent engagement between the stop $E^5$ and the surface $D^8$ of the member D. The action of the plunger J may be made still more sluggish as the stop $E^5$ moves into proximity with the surface $D^8$, as by means of the retarding device $J^2$ attached to the lower end of the plunger J and entering in, and restricting the flow of the liquid out of the chamber $A^7$ through the port $A^9$ under certain conditions. The retarding device $J^2$ is in the form of a bushing, loosely mounted on the stem $J^3$ depending from the plunger J, and provided at its lower end with a head $J^4$. This arrangement avoids delay in the upward movement of the plunger J as the bushing $J^2$ passes through the aperture $A^9$, since the bushing is free to rise under the pressure beneath it, and the head $J^4$ is too small to materially choke the flow through the aperture $A^9$. In this way the bushing $J^2$ is made to act somewhat like a check valve and saves time in the action of the machine. Other means of checking the outflow of liquid from the cylinder space $A^7$ as the stop $E^5$ approaches the surface $D^8$, may be employed. For example, a choke valve analogous to the choke valve shown and described in my prior Patent No. 950,234, granted February 22nd, 1910, may be placed in the pipe $U'$ and actuated by any convenient connection with the roll-over table E to retard the speed of rotation of the table as the stop $E^5$ approaches the surface $D^8$.

After the mold is deposited on the receiving device Z and the flask is disconnected from the table E, the latter is moved vertically upward to draw the patterns, and since the liquid beneath the plunger J gives this plunger an inelastic support, it serves in connection with the main plunger B to steady the initial upward movement of the patterns, which can be made as slow as desired by properly regulating the supply of air to the machine from the supply pipe N. The use of the plunger J in the pattern drawing operation as well as in the final downward movement of the anvil preparatory to placing the mold on the receiving device Z, is advantageous in that it engages the anvil at a line much closer to the center of gravity of the anvil table E and the load supported by the latter than is the axis of the latter, so that the tendency of the anvil B to bind in its cylinder chamber $A'$, because of this unbalanced disposition of its load, is minimized.

The rockers G are extended below the shaft $G'$, to form housings $G^2$ for spring pressed plungers $G^3$ and their springs $G^4$. These plungers do not come into play until the roll-over operation is practically completed, when the rockers G are moved in the counter-clockwise direction from the position occupied by them in Fig. 2. When this occurs the plungers $G^3$ engage the links H and tend to swing the yoke $H'$ out from under the stop $A^2$. The tension of the springs $G^4$ is insufficient, however, to give movement to the links H, owing to the frictional resistance to movement of the yoke $H'$ along the lug $A^2$, until after the stop $E^5$ engages the surface $D^8$ and the further downward movement of the anvil carries the yoke $H'$ out of engagement with the lug $A^2$. When this occurs the plungers $G^3$ force the links H out until the yoke $H'$ engages the portion $A^5$ of the supporting framework. When thereafter the anvil is moved up to draw the pattern, the yoke $H'$ moves up by the lug $A^2$, and, in consequence, the pattern drawing movement takes place without any tendency to roll the table E back toward its full line position as shown in Fig. 1. To bring about this return movement of the table E, a stop $A^3$ is secured to the supporting framework in position to be engaged by the yoke $H'$ after the pattern drawing movement proper is completed. When the yoke $H'$ thus engages the stop $A^3$, the table E is swung in the clockwise direction by the continued upward movement of the anvil until the table and anvil are restored to their relative positions shown in Fig. 4. At this time the table E, being unloaded, has its center of gravity to the right of the axis of the shaft $E'$, and when the anvil thereafter descends, the table E completes its return movement. In order to minimize the amount of air consumed, the stop $A^3$ may be adjusted by inserting it in whichever of the sockets $A^4$ is necessary to start the return rocking movement of the table E as soon as the patterns have cleared the particular mold being drawn. It will be understood, of course, that the primary function of the check valve V is to prevent the pressure fluid admitted to the bottom of the chamber $A'$ to roll the mold over and to draw the pattern, from wasting into the cylinder space $B'$ and moving the mold support with respect to the anvil or escaping through the inlet pipe $M^3$. The use of the floating anvil of such a jar molding machine as I have shown as the sole or principal actuating element for the roll-over mechanism simplifies the machine as a whole, and insures, on account of the necessarily large diameter of the anvil, an abundance of power for the operation of the roll-over mechanism. The fact that the exhaust from the chamber $A'$ is through the rather long pipe $T'$ and valve T insures a frictional resistance to the rise and fall of the anvil B in the jar molding machine which is of advantage as it aids in obtaining the accurately synchronous vibratory movements in opposite directions of the mold support and anvil desirable in a shockless machine.

In the modified construction shown in Fig. 10, the anvil BA, the mold support piston DA', and the outlet ports and valve mechanism controlling the exhaust from the chamber B' are essentially the same as in the construction first described. The valve casing MA is also practically identical with the valve casing M of the construction first described which it replaces. The operating means for the valve PA controlling the passage of the operating fluid from the valve casing MA into the lower end of the cylinder chamber differs in several respects from that shown in the construction first described. As shown the valve PA controlling port $M^2$ bears at its lower end against the upper end of the tubular stem $Q^5$ of a piston QA. The latter works in a cylinder chamber $B^{21}$ formed in a part $B^{20}$ screwed into and really forming a part of the bottom wall of the chamber B'. Passages $B^{22}$ formed in the wall of the chamber $B^{21}$ at the upper end of the latter open externally into the discharge passage $B^{130}$ of the anvil BA which corresponds to the passage $B^{13}$ in the anvil B of the construction first described. $Q^7$ represents a port serving to connect the tubular passage in the stem $Q^5$ to the lower end of the chamber B'. $P^{10}$ represents a stop connected to the lower end of the valve PA and limiting the upward movement of this valve member relative to the valve casing MA, but so shaped as not to close the port $M^2$. In the operation of this form of my invention the valve PA will also be positively held off of its seat when the mold support piston DA' is at the bottom of its stroke by the piston QA and the stem $Q^5$ of the latter, the parts being so proportioned that when the piston QA engages the plug $B^{23}$ closing the lower end of the chamber $P^{21}$ the valve PA will be lifted off its seat. With the valve PA lifted off its seat the pressure in the chamber $B^{21}$ below the piston QA will exceed the pressure in the chamber $B^{21}$ above the piston QA, and in consequence the piston QA will tend to keep the valve PA off its seat during the upward movement of the piston DA' until the piston QA reaches the upward limit of its movement, after which the valve PA seats. VA represents a check valve located at the bottom of the passage $B^{130}$ and preventing the flow of air upward through the passage $B^{130}$.

The modified form of apparatus shown in Fig. 11 differs from that in the construction first described above only in the valve casing MB replacing the valve casing M of the construction first described, and in the operating means employed in conjunction therewith. As shown the valve casing MB is formed with an inlet chamber $M^{10}$ into which the pipe $M^3$ opens. The port $M^{20}$ leading from the chamber $M^{10}$ to the chamber $D^3$ of the mold support piston D' is controlled by a valve member $M^{25}$ having an open ended tubular upper portion forming a piston which works in the chamber $M^{26}$ of the valve casing. Pressure fluid is admitted to the upper end of the chamber $M^{26}$ through the pipe $M^{28}$. A spring $M^{27}$ tends to hold the valve member $M^{25}$ against its seat and to cushion the upward movement of the latter. In operation the pressure fluid admitted to the chamber $M^{10}$ tends to lift the valve $M^{25}$ off its seat and thus open the port $M^{20}$, the spring $M^{27}$ being too weak to prevent the valve $M^{25}$ from lifting under the action of this pressure. The valve $M^{25}$ is held to its seat against the pressure previously referred to or allowed to lift under the pressure, by varying the pressure in the chamber $M^{26}$. This may be brought about by any one of various known forms of pilot valve mechanisms which may be employed to connect the upper end of the pipe $M^{28}$ to the atmosphere or to a source of fluid pressure. For instance, I may employ a pilot valve and operating mechanism therefor, such as the valve S and operating mechanism therefor of my prior Patent 1,055,336, granted March 11th, 1913, thereby making it possible to cut off the admission of the pressure fluid at the proper points in the stroke of the mold support relative to the anvil with different loads on the mold support to obtain an economic utilization of the pressure fluid with each load of the mold support.

It will be apparent to those skilled in the art that with the different forms of valve mechanisms shown, the clearance space may be made desirably small. The character of the exhaust valve S employed makes it possible to secure the large exhaust port area and the avoidance of wire drawing necessary for efficient operation. The various forms of inlet valve mechanisms shown are each comparatively simple, and the construction described makes it possible to remove these valve mechanisms from the hollow piston of the mold support for cleaning, inspection, or repairs, whenever this is desirable. To accomplish this the spider $M^4$ is detached from the mold support, the coupling $M^6$ in the pipe $M^7$ is loosened, and in the case of the construction shown in Fig. 11 the coupling $M^{29}$ in the pipe $M^{28}$ is also loosened, after which the inlet valve casing with the pipe directly attached thereto can be drawn out of the machine. The inlet valve mechanism disclosed, but not claimed herein, is covered by the claims of my co-pending application, Serial No. 849,641, filed July 8, 1914.

While in accordance with the provisions of the statutes, I have illustrated and described the best forms of my invention now known to me, it will be apparent to those skilled in the art that changes may be made in the forms of apparatus described without departing from the spirit of my invention, and that under some conditions certain features of my invention may be used without a corresponding use of other features.

Having now described my invention, what I claim as new and desire to secure by Letters Patent, is:

1. The combination with the base, floating anvil, and mold support of a shockless jar molding machine of a rock-over table hinged to said support, and connections between said table, anvil and base whereby said table may be rocked over by giving said anvil predetermined vertical movements relative to its base.

2. The combination with the base, floating anvil, and mold support of a shockless jar molding machine of a rock-over table hinged to said support, and connections between said table, anvil and base whereby said table may be rocked over by giving said anvil predetermined vertical movements relative to its base, said connections comprising a rocking element pivotally connected to said anvil, a link connection between said element and table and means connecting said rocking element to said base.

3. The combination with the base, floating anvil and mold support of a jar molding machine, of a rock-over table hinged to said mold support, and connections between said table, anvil and base whereby on a predetermined upward movement of said anvil said table will be given a portion of its rock-over movement and may complete the latter on a subsequent downward movement of said anvil.

4. The combination with the base, floating anvil and mold support of a jar molding machine, of a rock-over table hinged to said mold support, connections between said table, anvil and base whereby on a predetermined upward movement of said anvil said table will be given a portion of its rock-over movement and may complete the latter on a subsequent downward movement of said anvil, and provisions for adjusting said connections so that upon an initial subsequent upward movement of the anvil the inverted table will move upward without rocking movement and on a further upward movement will make a portion of its return rocking movement and may complete the latter on a subsequent downward movement of said anvil.

5. In combination with the base, floating anvil, and mold support of a jar molding machine, of a rock-over table hinged to said mold support, connections between said table, anvil and base whereby said table will be caused to make a portion of its rock-over movement by a predetermined upward movement of the anvil, and may complete said rock-over movement on a subsequent downward movement of the anvil, and an auxiliary device adapted to impart a thrust to the table tending to complete said rocking-over movement as the upward movement of the anvil ceases and the said downward movement commences.

6. The combination with the base, floating anvil, and mold support of a jar molding machine, of a rock-over table hinged to said mold support, connections between said table, anvil and base whereby said table will be caused to make a portion of its rocking-over movement by a predetermined upward movement of said anvil and may complete said rock-over movement on a subsequent downward movement of said anvil, and an auxiliary device adapted to engage said anvil and retard the said downward movement of the latter, and to aid in bringing about a subsequent upward movement of the anvil.

7. The combination with the base, floating anvil, and mold support of a jar molding machine, of a rock-over table hinged to said support, connections between said table, anvil and base whereby said table will be caused to make a portion of its rock-over movement by a predetermined upward movement of the anvil and may complete said rock-over movement on a subsequent downward movement of the anvil, means for exerting a variable lifting force on said anvil to bring about said movements of the latter, an auxiliary power applying device, provisions through which said device engages said table and imparts a thrust thereto tending to continue said rocking-over movement as said upward movement of the anvil ceases and its downward movement begins, and through which said table then holds said device out of operative engagement with said anvil, and other provisions through which said device engages said anvil, after a further rocking movement of the table, and retards the further downward movement, and aids in bringing about a subsequent upward movement of the anvil.

8. The combination with the base, floating anvil, and mold support of a jar molding machine, said base and anvil having coöperating piston and cylinder elements, of a rock-over table hinged to said mold support, connections between said table, anvil and base whereby said table will be caused to make a portion of its rocking-over movement by a predetermined upward movement of said anvil and may complete said rocking-over movement on a subsequent downward movement of said anvil, means regulating the admission to and exhaust from said cylinder element of a gaseous pressure fluid for bringing about vertical movements of said anvil, and a hydraulic jack adapted to act on said anvil to oppose said downward movement and to aid in bringing about a subsequent upward pattern drawing movement of the anvil.

9. The combination with the base, floating anvil, and mold support of a jar molding machine, said base and anvil having co-operating piston and cylinder elements, of a rock-over table having a hinge connection with said mold support at one side of the axis of said elements, connections between said table, anvil and base whereby said table will be caused to make a portion of its rocking over movement by a predetermined upward movement of said anvil and may complete said rocking-over movement on a subsequent downward movement of said anvil, means regulating the admission to and exhaust from said cylinder element of a gaseous pressure fluid for bringing about vertical movements of said anvil, and a hydraulic jack adapted to act on said anvil to oppose said downward movement and to aid in bringing about a subsequent upward pattern drawing movement of the anvil, the line of action on said anvil of said jack being parallel to the axis of said elements and between the latter and the axis of said hinge connection.

10. In a rock-over molding machine, a rock-over table formed with slots extending into the table from the edge of the latter and with a pair of ribs on the under side of the table at the opposite sides of each slot and clamps for securing a mold flask against said table each comprising a portion passing through said slot, a portion adapted to bear against said ribs and a portion adapted to take over the mold flask.

11. The combination with the mold support, floating anvil and base of a shockless jar molding machine in which said mold support and anvil are formed one with a piston and the other with a chamber in which said piston works, and in which said base and anvil are formed one with a piston and the other with a chamber in which said piston works, and in which said anvil is formed with passages through which the first mentioned chamber may exhaust into the second mentioned chamber, of a rock-over table hinged to said mold support, connections between said table, anvil and base whereby said table may be caused to make its rocking-over movements by predetermined rising and falling movements of the anvil, means regulating the admission of a pressure fluid to the first mentioned chamber and its exhaust therefrom through said passages, a check valve preventing reverse flow through said passages, and means for connecting said second mentioned chamber to a source of pressure fluid or to exhaust to bring about said rising and falling movements of said anvil.

12. The combination with the mold support, floating anvil and base of a shockless jar molding machine in which the lower end of the anvil forms a piston and the base is formed with a chamber in which said piston works and said anvil is formed with a chamber in its upper end and the mold support is formed with a piston working in said chamber, of a rock-over table hinged to said mold support, connections between said table, anvil and base whereby said table may be caused to make its rocking-over movements by predetermined rising and falling movements of the anvil, means for connecting the chamber in the base to a source of pressure fluid or to exhaust to bring about said rising and falling movements, an inlet valve mechanism controlling the admission of a pressure fluid to said anvil chamber, said anvil being formed with exhaust passages leading from said anvil chamber through the anvil to the chamber in the base, a check valve preventing flow from the last mentioned chamber into the anvil chamber, and an exhaust valve controlling the flow out of the anvil chamber into said exhaust passages.

13. The combination with the base, floating anvil, mold support and rock over table of a shockless jar molding machine, of means whereby vertical movements of the floating anvil may be utilized in effecting the rock over movement of said table.

WILFRED LEWIS.

Witnesses:
ARNOLD KATZ.
D. STEWART.